Jan. 1, 1935.   R. F. O'MARA   1,985,947
CONCENTRATOR
Filed Aug. 7, 1931   3 Sheets-Sheet 1
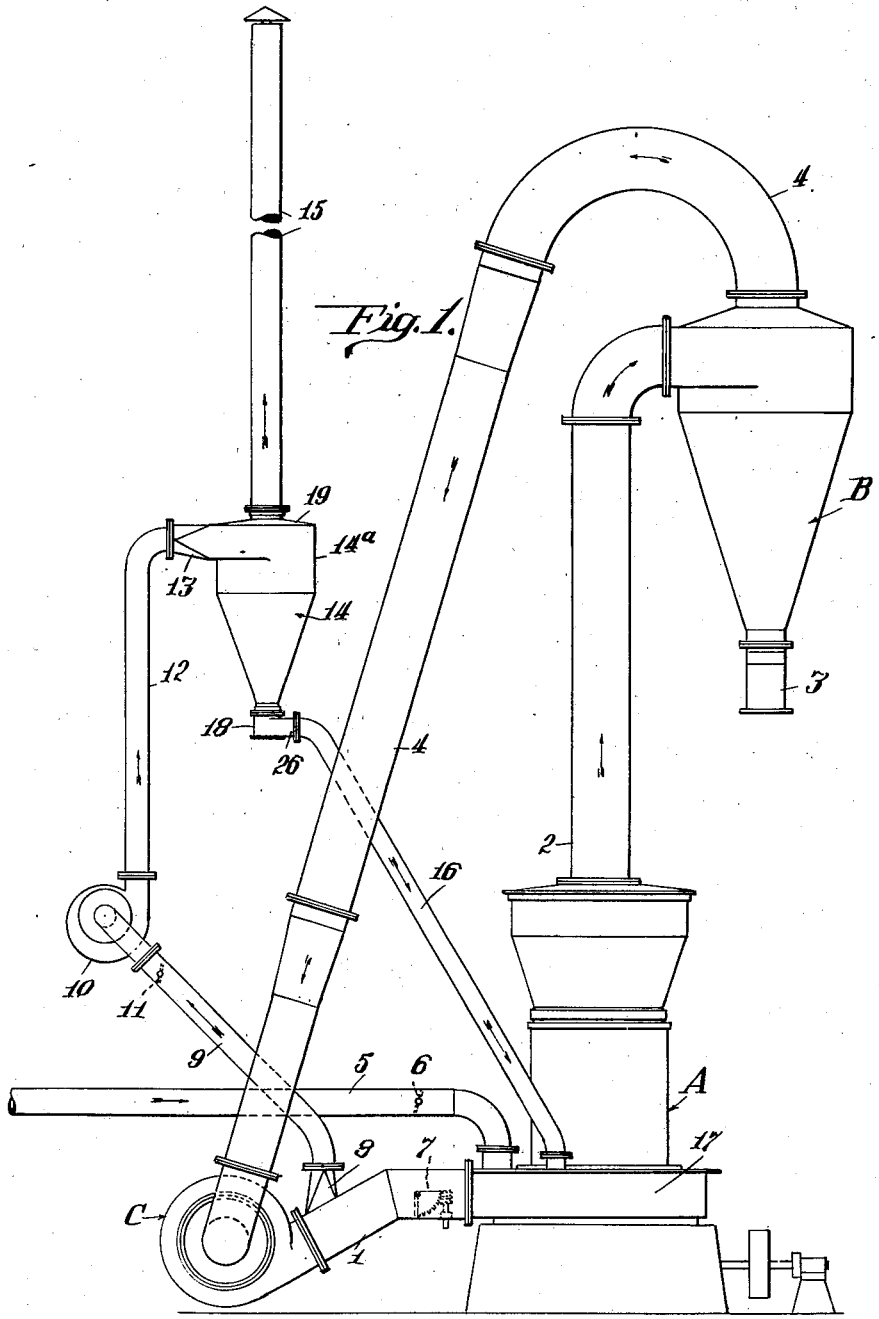
Inventor
Richard F. O'Mara
By Barnett & Truman
Attorneys Jan. 1, 1935.　　　　R. F. O'MARA　　　　1,985,947
CONCENTRATOR
Filed Aug. 7, 1931　　　3 Sheets-Sheet 2
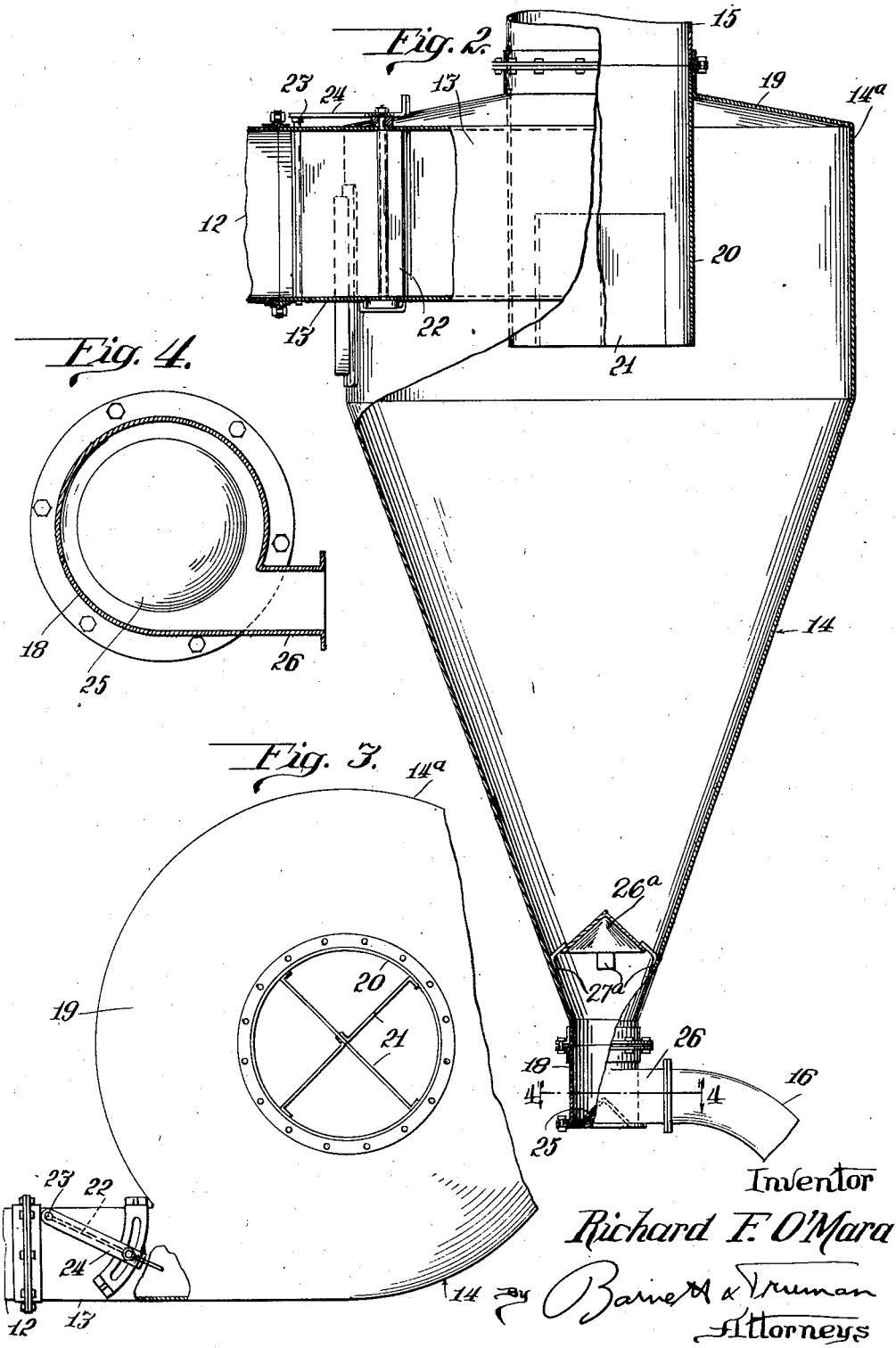

Jan. 1, 1935. — R. F. O'MARA — 1,985,947
CONCENTRATOR
Filed Aug. 7, 1931 — 3 Sheets-Sheet 3
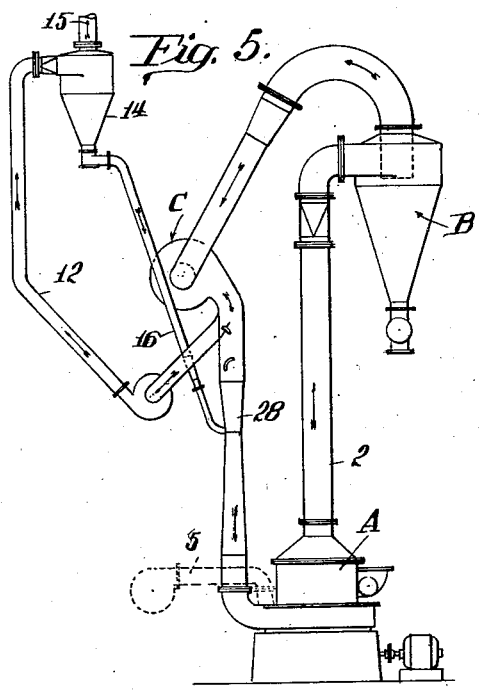
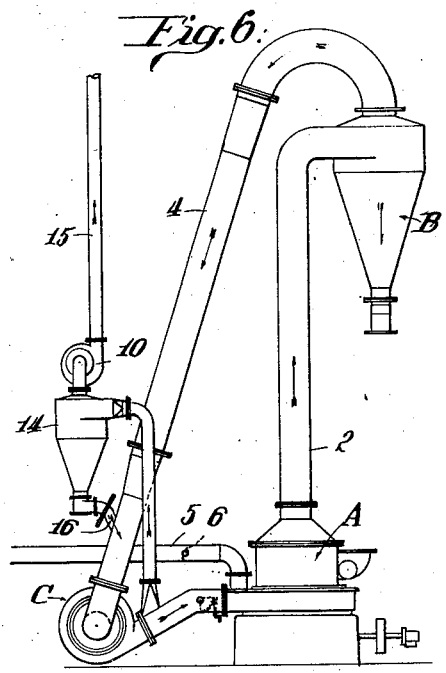
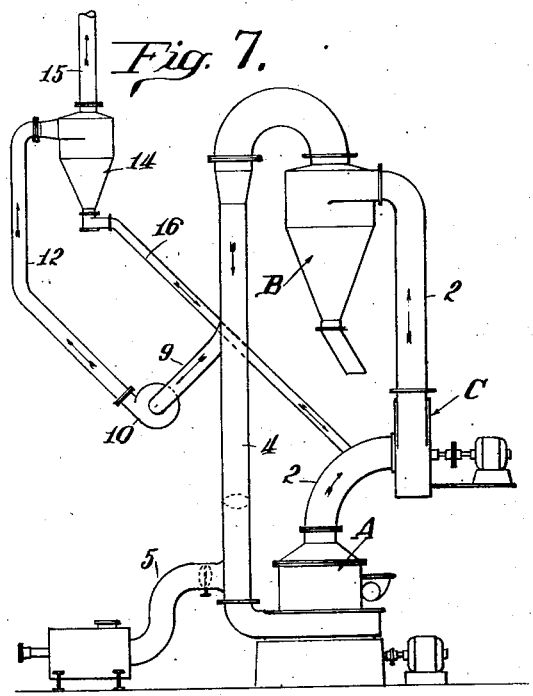
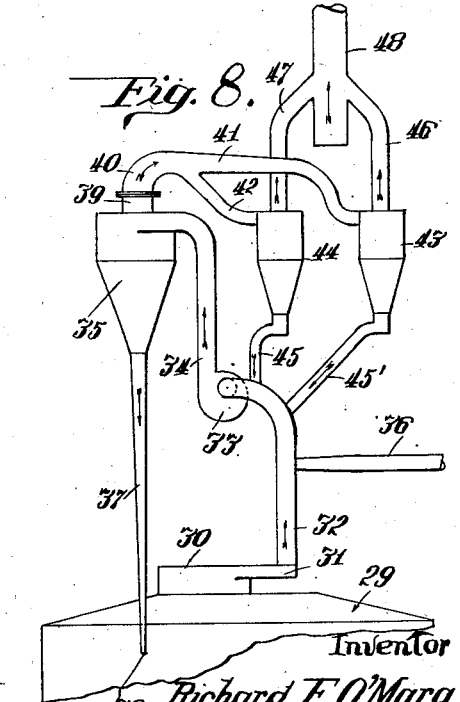
Inventor
Richard F. O'Mara
By Barnett & Truman
Attorneys Patented Jan. 1, 1935

1,985,947

UNITED STATES PATENT OFFICE 1,985,947

CONCENTRATOR

Richard F. O'Mara, La Fayette, Ind., assignor to The Raymond Brothers Impact Pulverizer Company, Chicago, Ill., a corporation of Illinois Application August 7, 1931, Serial No. 555,762

1 Claim. (Cl. 209—144)

This invention relates to new and useful improvements in a concentrator for withdrawing finely divided material from suspension in an air stream, together with an improved circulation system in which this concentrator is used.

In certain pulverizing processes, as well as in certain production processes, such as the calcining of gypsum, it is necessary to vent a certain quantity of air from an air-circulating system, and this air to be vented may hold in suspension a certain quantity of very finely divided material which it is desirable to recover or salvage before this air is dissipated from the system. For example, in a well known form of pulverizing system, the finely pulverized material is withdrawn from the mill or pulverizer in suspension in air, and this air is passed through a separator, (usually of the cyclone type) wherein the greater portion of the pulverized material is separated out from the air stream and collected. The air from the pulverizer is returned to the mill, thus completing the circuit, there being a fan or blower at some position in this continuous conduit system for producing the suction on the mill and keeping the air stream in circulation. In order to keep the air in the pulverizer at a desired temperature and to keep down the moisture content in the system, a certain amount of preheated air is introduced into this circulating air stream, usually at the pulverizer, or just in advance thereof. To compensate for this heated air which is introduced, it is necessary to withdraw or vent a certain portion of the original air stream and this vented air is withdrawn from the air stream returned from the separator to the mill. This return air stream contains a small proportion of very finely divided material which is not entirely removed by the first separating process, and such of this material as is carried by the vented air stream will be lost.

One purpose of this present invention is to prevent the loss, as far as possible, of this finely divided material carried by the vented air stream. According to the present invention, a slightly greater volume of air is withdrawn from the main air stream than is to be vented, and this air is passed through an improved separator or concentrator from which the greater portion of this auxiliary air stream is vented to the outside air. The remainder of the auxiliary air stream, carrying the greater proportion of the finely divided material as removed by the concentrator, is returned to the main circulating air system. The improved concentrator is of a modified cyclone type and is provided at its inlet with a means for controlling the velocity of the air stream admitted to the concentrator, and is provided at its outlet with means for withdrawing the collected material in suspension in air, since this material is too finely divided to be entirely removed from the air, at least in any material quantities.

The general object of this invention is to provide an improved method and apparatus for recovering the very finely divided material carried by an air stream to be vented from a circulating system, as briefly described hereinabove and disclosed more in detail in the specifications which follow.

Another object is to provide an improved form of concentrator for collecting finely divided material.

Another object is to provide a concentrator having means for controlling the velocity of the air stream which enters the concentrating chamber.

Another object is to provide improved means for removing finely divided material from a concentrator in suspension in air.

Other objects and advantages of this invention will be more apparent from the following detailed description of certain approved forms of apparatus embodying the principles of this invention.

In the accompanying drawings:

Fig. 1 is a diagrammatic elevation of a pulverizing system embodying the principles of this invention and utilizing one of the improved concentrators.

Fig. 2 is an enlarged central vertical section through the concentrator, parts being shown in side elevation.

Fig. 3 is a plan view, partially broken away, of the concentrator shown in Fig. 2.

Fig. 4 is a horizontal section, on a larger scale, taken substantially on the line 4—4 of Fig. 2.

Figs. 5, 6, 7, and 8 are diagrammatic elevations, similar to Fig. 1, showing other types of installations in which the improved concentrator is used.

Referring first to the typical pulverizing system shown in Fig. 1, A indicates a mill or pulverizer of well known type, B is the main separator, and C is the fan for actuating the circulating air stream. The material to be ground or pulverized is introduced into mill or pulverizer A in any suitable manner (not here illustrated), and the main air stream enters the pulverizer through conduit 1 from the outlet of fan C. The fan C creates a suction which withdraws an air stream through conduit 2 from the top of pulverizer A, and in suspension in this air stream is carried out that portion of the material that has been pulverized to a sufficient degree of fineness. The air stream in conduit 2 is led tangentially into the upper portion of the separator B, which may be of the usual cyclone type, and the greater portion of the suspended material settles out in this separator and is collected through the spout 3 at the lower end thereof. The air stream, from which most of the pulverized material has been removed, is returned through conduit 4 to the suction side of fan C and passes from the fan through conduit 1 back into the pulverizer A, thus completing the circulating system. A certain proportion of pre-heated air (or gaseous products of combustion) obtained from any suitable source, is introduced through pipe 5 into conduit 1 or into the lower portion of the pulverizer, the proportion of this heated air which is added to the air stream being regulated by the valve 6 in conduit 5 and the valve 7 in conduit 1.

It will be apparent that the addition of this heated air at one point in the circulating system necessitates the removal or venting of a certain proportion of the original air stream from some other point in the system, and it is also desirable to vent a certain proportion of the original air stream in order to keep down the moisture content. This air to be removed will be withdrawn from some location in the returning air stream between separator B and pulverizer A, but although the major portion of the pulverized material has been removed by the separator B there will be a certain quantity of very finely divided material held in suspension in this returning air stream and a part of this material will be lost in the stream that is vented from the system unless some means is utilized to recover this material. The present invention relates to an improved method and apparatus for performing this function.

In the particular installation illustrated in Fig. 1, the air for the auxiliary air stream from which a portion is vented is withdrawn through outlet 8 from the conduit 1 adjacent the outlet of fan C. The outer side of conduit 1 leads substantially tangentially from the fan C, so that the greater proportion of the suspended material will be thrown by centrifugal force along the outer portion of the conduit, and the outlet 8 leads from the inner side of the conduit so that the air withdrawn therefrom will contain a minimum amount of the suspended material. From outlet 8 a conduit 9 leads to the inlet of the auxiliary fan 10 which is preferably used to positively keep up a circulation through the auxiliary air conduit system, there being a valve 11 positioned in this inlet conduit 9 to regulate to some extent the volume and velocity of the auxiliary air stream. From fan 10, this auxiliary air stream is propelled through conduit 12 into the inlet 13 of the improved concentrator, indicated generally at 14, and hereinafter described in detail. In this concentrator the greater proportion of the finely divided suspended material is removed from the main air stream which is vented through outlet pipe 15 leading from the top of concentrator 14 to the outer air. A smaller proportion of the auxiliary air stream flows out from concentrator 14 through the conduit 16 leading from the bottom of the concentrator and carries therein the collected material which is delivered back through conduit 16 into some selected portion of the main circulating system. The conduit 16 may lead into nearly any portion of the main air conduit system. As shown in Fig. 1, conduit 16 leads into the air intake manifold 17 at the base of pulverizer A.

Referring now more particularly to Figs. 2, 3, and 4, the improved concentrator 14 will be described more in detail. This concentrator is of a modified cyclone separator type and comprises a closed housing of inverted conical form having a larger upper substantially cylindrical portion 14ª, and having a smaller substantially cylindrical discharge housing 18 at its lower end. The inlet conduit 13 leads substantially tangentially into the larger upper portion 14ª of the concentrator so that a whirling movement will be produced in the air content of the concentrator, as is well understood in this art. The outlet pipe 15, through which the air is vented, leads through the top or closure 19 of the concentrator and is provided with an extension 20 leading centrally downward within the concentrator below the inlet passage 13. Cross-vanes 21 to further impede the outflowing air may be provided in the lower inlet end of pipe extension 20, although these vanes are not absolutely essential. A swinging gate valve 22 is pivoted on a vertical axis at 23 within inlet conduit 13 so as to swing toward or from the outer tangential wall of this conduit and thus vary the effective size of the inlet to the concentrator. The efficiency of the concentrator is a function of the inlet velocity and the fineness and character of the dust to be separated from the air, and it will be apparent that the inlet velocity can be effectively regulated by properly positioning the inlet valve 22. It will be noted that in any position of adjustment of this vertical valve or damper, the entering air stream will be directed tangentially along the inner surface of the outer wall of the concentrator so that the maximum whirling or centrifugal effect will be imparted to the suspended material introduced into the concentrator. The valve or damper may be adjusted in any suitable manner from the outside of inlet conduit 13, as by means of the adjusting mechanism indicated at 24 in Figs. 2 and 3.

As is usual in a separator of this type, the suspended material will be deposited or concentrated adjacent the enclosing walls of the housing, due to the centrifugal force imparted by the whirling air, but due to the extreme fineness of this suspended material, it will not effectively settle out at the lower end of the conical housing unless a positive down draft is provided. In the absence of such a down draft, too large a proportion of the suspended material will be caught in the air vortex and sucked up through the outlet conduit 15 and hence lost. According to the present invention, the smaller lower end of the housing 14 is provided with the cylindrical extension 18 having the upwardly projecting conical bottom portion 25, and provided with the outlet 26 leading substantially tangentially from one side of this housing 18 to connect with the outlet conduit 16. A relatively small proportion of the air stream introduced into the concentrator is drawn back through this conduit 16 into the main air circulating system, thus producing a sufficient down draft adjacent the inner walls of the concentrator housing 14 to effectively suck down the air carrying the greater concentration of the suspended material. This air, still having a whirling movement about the inner walls of the concentrator, will pass out through tangential outlet 26 carrying with it the greater portion of the suspended material which is delivered back through conduit 16 into the main circulating system. A second conical member 26ª is centrally supported by means of brackets 27ª within the lower portion of housing 14, so as to leave an annular passage adjacent the side walls of the housing. The upwardly projecting conical members 25 and 26ª serve to puncture the central vortex tending to suck the material upwardly through the outlet 20, thus maintaining the whirling movement of the air within the lower extension 18 and reducing the loss of suspended material to a minimum.

In the general operation of this concentrator, the auxiliary air stream is positively delivered from fan 10 through conduit 12 into the upper portion of the concentrator housing, and the inlet velocity of the air stream can be regulated in accordance with the nature of the material that is to be separated out by properly adjusting the valve 22. This inlet velocity should also have a certain relation to the outlet suction or downdraft through conduit 16, and this can be regulated by a proper adjustment of the valve 22. This air stream being projected tangentially into the upper portion of the concentrator casing with a predetermined velocity will produce a whirling movement of the entire body of air within the housing and the suspended material will be concentrated in the air adjacent the outer walls of the housing by the action of centrifugal force. The down draft produced by the suction pipe 16 will cause the air adjacent the walls of the housing to spiral downwardly along these walls and eventually be drawn out through the tangential outlet 26. The conical members 25 and 26ª serve to prevent the central vortex from extending down into the restricted lower end of the housing, thus decreasing the tendency for any of the suspended material to be drawn out with the major portion of the air stream which flows upwardly through conduit 15 and is dissipated. Only a sufficient quantity of the auxiliary air stream flows back through conduit 16 to carry back the suspended material and enforce the proper down draft within the lower portion of concentrator 14.

The installation shown in Fig. 1 is merely one example of a pulverizing system to which this invention may be adapted, and to illustrate this fact, other examples are shown in Figs. 5, 6, 7 and 8. The main pulverizing system disclosed in Fig. 5 is substantially the same as in Fig. 1, although fan C has been shown in an elevated position instead of being supported in the lower position of Fig. 1, this latter being merely a matter of convenience. In Fig. 5, the return conduit 16 from concentrator 14 leads into a restricted venturi 28 positioned in the return conduit between main fan C and the pulverizer A, whereby a greater suction on the conduit 16 is produced.

In the installation shown in Fig. 6, the return conduit 16 from the concentrator leads back into the return pipe 4 between the separator B and fan C. The actuating fan 10 for the auxiliary circuit is positioned in the outlet conduit 15 above the concentrator 14, thereby producing a suction on the vent pipe in order to induce the proper circulation in the auxiliary system. In the form shown in Fig. 7, the main fan C is installed in the conduit 2 between the pulverizer A and the main separator B. The auxiliary air stream for the concentrator is drawn out from return conduit 4 between separator B and the pulverizer A and a portion thereof is returned with the collected concentrate through conduit 16 into the conduit 2 at the inlet side of the main fan C. In this example, as in the one first described, the return conduit 16 might be connected into various other portions of the main circulating system.

In the installation shown in Fig. 8, a gypsum calcining kettle is indicated at 29, the kettle being provided with a dome 30 having an outlet 31 through which gases are exhausted so as to decrease, as far as possible, the amount of gypsum carried out in suspension in these gases. These gases are drawn up through conduit 32 by means of a fan 33 and projected through conduit 34 into the main separator 35. Heated gases are introduced through conduit 36 so as to keep the suspended gypsum at high temperature and prevent hydration. The greater proportion of the suspended gypsum is separated out in the separator 35 and gravitates back through conduit 37 into the kettle 29. The outlet 38 of conduit 37 extends below the level of the solid materials in kettle 29 so as to prevent gases and suspended dust particles from flowing upwardly through this conduit. The gases from outlet 39 of separator 35 flow out through conduit 40, which is divided into two branch conduits 41 and 42, leading into the pair of concentrators 43 and 44 which may be of the same improved type as hereinabove described. The very finely divided gypsum dust recovered in these concentrators is carried back in suspension in a small portion of the air stream through conduits 45 and 45'' into the outlet conduit 32 and thence back into the main separator. The gases thus relieved of the greater portion of the suspended gypsum flow out through conduits 46 and 47 into the main outlet flue 48.

It is to be understood that in all of the above description and in the claim which follows, the term "air" is intended to cover not only atmospheric air, but any other gases, such as combustion gases, or any combination of air and these gases, such as may flow through the circulating system and carry the finely divided material in suspension.

I claim:

A concentrator for venting air from an air stream in which finely divided materials are suspended, comprising a closed housing of inverted conical form, an air inlet passage leading substantially tangentially into the larger upper portion of the housing, a relatively large air outlet leading vertically upward from the central portion of the top of the housing, a pair of upwardly projecting cones positioned centrally in the smaller lower portion of the housing, one of the cones being at the lower end of the housing and one positioned thereabove with an annular air passage around the larger lower end of this cone, and a relatively small outlet passage leading tangentially from one side of the lower end portion of the housing at one side of the lowermost inner cone, through which outlet passage the material is withdrawn in suspension in an air stream.

RICHARD F. O'MARA.